United States Patent
Sheng et al.

(10) Patent No.: US 11,175,652 B2
(45) Date of Patent: Nov. 16, 2021

(54) REAL-TIME DETECTION AND VISUALIZATION OF POTENTIAL IMPAIRMENTS IN UNDER-FLOOR APPLIANCES

(71) Applicant: INTERNATIONAL BUSINESS MACHINES CORPORATION, Armonk, NY (US)

(72) Inventors: Hao Sheng, Ningbo (CN); Rong Fu, Ningbo (CN); Kang Zhang, Shanghai (CN); Jian Dong Yin, Beijing (CN); Zhuo Cai, Beijing (CN); Wen Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 361 days.

(21) Appl. No.: 16/280,105

(22) Filed: Feb. 20, 2019

(65) Prior Publication Data

US 2020/0264598 A1 Aug. 20, 2020

(51) Int. Cl.
*G05B 23/02* (2006.01)
*G05D 1/00* (2006.01)
(Continued)

(52) U.S. Cl.
CPC ....... *G05B 23/0283* (2013.01); *G05D 1/0088* (2013.01); *G06N 20/00* (2019.01); *G06T 11/206* (2013.01); *H04L 67/12* (2013.01)

(58) Field of Classification Search
CPC ........ G05B 23/02; G05B 1/00; G05D 1/0246; G05D 1/02; G05D 1/00; G05D 1/0088;
(Continued)

(56) References Cited

U.S. PATENT DOCUMENTS 5,188,143 A 2/1993 Krebs
6,147,613 A 11/2000 Doumit
(Continued)

FOREIGN PATENT DOCUMENTS

GB 2516545 * 1/2015 ............. B05B 13/04
GB 2538122 * 11/2016 ............. B05B 13/04
(Continued)

OTHER PUBLICATIONS

S. B. Nickerson, Aug. 28, 1997, describes an autonomous mobile robot for known industrial environments, 28 pages (Year: 1997).*
(Continued)

*Primary Examiner* — Tung S Lau
(74) *Attorney, Agent, or Firm* — Rakesh Roy

(57) ABSTRACT

A method, computer system, and a computer program product for predictive maintenance is provided. The present invention may include recording, using an autonomous robot moving along a surface through a plurality of positions in a room, a plurality of data associated with an under-floor appliance provided beneath the surface of the room. The present invention may also include calculating, based on the recorded plurality of data associated with the under-floor appliance provided beneath the surface of the room, a material composition associated with the plurality of positions in the room. The present invention may further include generating, based on the calculated material composition associated with the plurality of positions in the room, a layout diagram for visualizing a layout of the under-floor appliance provided beneath the surface of the room.

20 Claims, 8 Drawing Sheets

(51) Int. Cl.
   *G06T 11/20* (2006.01)
   *G06N 20/00* (2019.01)
   *H04L 29/08* (2006.01)

(58) Field of Classification Search
   CPC ......... G05D 2201/0215; G05D 1/0255; G05D 2201/0207; G06N 20/00; G06T 11/20; G06T 11/206; H04L 67/12; B25J 9/0078; E04B 5/00; A47L 9/28; B05B 13/04
   See application file for complete search history.

(56) References Cited

U.S. PATENT DOCUMENTS

| | | | |
|---|---|---|---|
| 6,639,517 B1 | 10/2003 | Chapman et al. | |
| 7,706,917 B1 * | 4/2010 | Chiappetta | G05D 1/0246 700/245 |
| 9,000,778 B2 | 4/2015 | Ziolkowski et al. | |
| 9,488,567 B2 | 11/2016 | Sohn et al. | |
| 2015/0179044 A1 | 6/2015 | Wu et al. | |
| 2015/0360882 A1 * | 12/2015 | Girtman | B25J 11/00 700/213 |
| 2018/0093289 A1 * | 4/2018 | Raman | B25J 9/0078 |

FOREIGN PATENT DOCUMENTS

| | | | | |
|---|---|---|---|---|
| JP | H08-1552 | * | 1/1996 | ............... E04B 5/00 |
| JP | 3030800 | * | 10/2000 | ............... E04B 5/00 |
| JP | 2012-130781 | * | 7/2012 | ............... A47L 9/28 |
| JP | 2013044612 A | | 3/2013 | |
| JP | 2013-146587 | * | 8/2013 | ............... A47L 9/28 |
| JP | 5318988 | * | 10/2013 | ............... A47L 9/28 |
| JP | 5736000 | * | 6/2015 | ............... G05D 1/02 |
| JP | 5856631 | * | 2/2016 | ............... A47L 9/28 |
| JP | 6054425 | * | 12/2016 | ............... G05D 1/02 |
| JP | 6405136 | * | 10/2018 | ............... A47L 9/28 |
| JP | 6672186 | * | 3/2020 | ............... A47L 9/28 |
| WO | WO 2016/123421 | * | 8/2016 | ............... G05D 1/02 |

OTHER PUBLICATIONS

Nolfi, Stefano, How to Evolve Autonomous Robots Different Approaches in Evolutionary Robotics, 1994, 9 pages (Year: 1994).*
Radoslaw Cechowicz, Indoor vehicle tracking with a smart MEMS sensor, 2019, 5 pages (Year: 2019).*
Mircea Nițulescu, Mobile Robot Tracking Control Experiments along Memorized Planed Trajectories, 2006 6 pages (Year: 2006).*
Hajime Aoyama, Development of Mine Detection Robot System, 2007, 8 pages (Year: 2007).*
Technology Demonstration of Space Intravehicular Automation and Robotics, 1994, 53 pages (Year: 1994).*
Bernold et al., "A Multi-Sensory Approach to 3-D Mapping of Underground Utilities," Proceedings of the 19th ISARC, 2002, p. 1-6, Washington, U.S.A.
Mell et al., "The NIST Definition of Cloud Computing," National Institute of Standards and Technology, Sep. 2011, p. 1-3, Special Publication 800-145.

* cited by examiner

REAL-TIME DETECTION AND VISUALIZATION OF POTENTIAL IMPAIRMENTS IN UNDER-FLOOR APPLIANCES

BACKGROUND

The present invention relates generally to the field of computing, and more particularly to predictive analytics.

Under-floor appliances, such as under-floor heating systems, have gained popularity as an energy-efficient and space saving alternative to traditional forced-air heating systems for indoor climate control. However, by virtue of being installed beneath a surface or a floor, under-floor appliances are difficult to maintain. Typically, users have to rely on professionals to repair the under-floor appliance after an appliance failure has already occurred. Such reactive maintenance is both time-consuming and expensive for the user.

SUMMARY

Embodiments of the present invention disclose a method, computer system, and a computer program product for predictive maintenance. The present invention may include recording, using an autonomous robot moving along a surface through a plurality of positions in a room, a plurality of data associated with an under-floor appliance provided beneath the surface of the room. The present invention may also include calculating, based on the recorded plurality of data associated with the under-floor appliance provided beneath the surface of the room, a material composition associated with the plurality of positions in the room. The present invention may further include generating, based on the calculated material composition associated with the plurality of positions in the room, a layout diagram for visualizing a layout of the under-floor appliance provided beneath the surface of the room.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
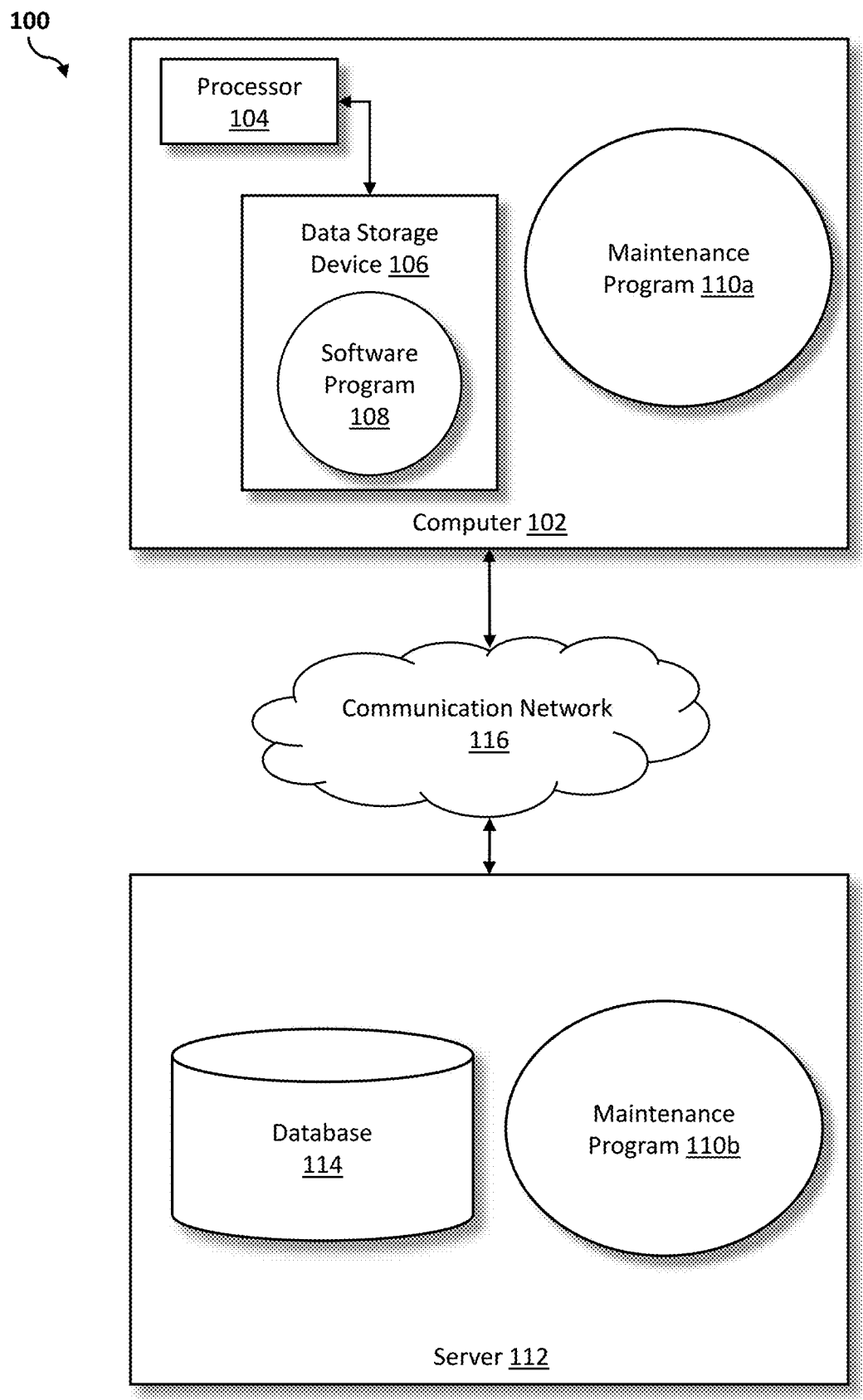
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for predictive maintenance of under-floor appliances. As such, the present embodiment has the capacity to improve the technical field of predictive analytics by performing real-time detection of potential impairments in an under-floor appliance and rendering a visualized warning including the positions of the potential impairments electronically localized (e.g., marked) in a layout diagram of the under-floor appliance.

More specifically, a maintenance program may be implemented into an autonomous robot and may be enabled to control various components and systems of the autonomous robot, such as a data processing component, a data collecting component, a warning component, and a navigation system. The navigation system may enable moving and maneuvering the autonomous robot along a trajectory in a given environment. As the autonomous robot traverses the environment, the maintenance program may implement the data collecting component to collect and record real-time multi-dimensional data (e.g., position, temperature, humidity, reflected sound wave characteristics) at each position in the environment. Next, the data processing component may analyze the reflected sound wave characteristics and generate a layout diagram (e.g., planar graph, floor plan, map) of the under-floor heating system.

Then, the maintenance program may compare the collected real-time multi-dimensional dataset with a historical multi-dimensional dataset at each corresponding position of the environment. Based on the comparison, the maintenance program may detect abnormalities or anomalies in the real-time multi-dimensional dataset which may indicate, in real-time, potential impairments or damages in the under-floor heating system that may lead to failure in the under-floor heating system. Thereafter, the warning component may transmit a visualized warning to a user device to report the positions of the potential impairments electronically localized (e.g., marked) in the layout diagram generated by the data processing component.

As described previously, under-floor appliances, such as under-floor heating systems have gained popularity as an energy-efficient and space saving alternative to traditional forced-air heating systems for indoor climate control. However, by virtue of being installed beneath a surface or a floor, under-floor appliances are difficult to maintain. Typically, users have to rely on professionals to repair the under-floor appliance after an appliance failure has already occurred. Such reactive maintenance is both time-consuming and expensive for the user.

Under-floor heating systems use radiant heat emitted from a heat source installed in the foundation or under the floor of a room to heat an indoor space from the ground up. The under-floor heating source may depend on whether a hydronic or an electric system is used. Hydronic systems typically use heated fluids flowing through pipes in a closed loop, whereas electric systems use natural electrical resistance from electricity flowing through wire mesh or loops of wires running beneath the surface of the floor.

Therefore, it may be advantageous to, among other things, provide a way to detect abnormalities or anomalies in a real-time multi-dimensional dataset corresponding to an under-floor heating system which may indicate, in real-time, potential impairments or damages in the under-floor heating system that may lead to actual failure in the under-floor heating system. It may also be advantageous to, among other things, provide a way to automatically generate a layout diagram of an under-floor heating system layout within an environment. It may further be advantageous to, among other things, provide a way to alert a user through a visualized warning configured to report the positions of the potential impairments electronically localized (e.g., marked) in the layout diagram of an under-floor heating system.

According to at least one embodiment, a maintenance program may compare a real-time multi-dimensional dataset with a historical multi-dimensional dataset associated with an under-floor heating system in order to detect abnormalities or anomalies in the real-time multi-dimensional dataset which may predict potential impairments in the under-floor heating system. In order to perform the comparison between the real-time multi-dimensional dataset and the historical multi-dimensional dataset, the maintenance program may designate the historical multi-dimensional dataset as indicating a normal condition (e.g., baseline measure) of the under-floor heating system.

The maintenance program may utilize a machine learning (ML) algorithm and the historical multi-dimensional dataset in order to learn the parameters of the normal condition associated with the under-floor heating system. In one embodiment, the historical multi-dimensional dataset may include data across multiple metrics, variables, or attributes, such as temperature, humidity, and reflected sound wave characteristics. In one embodiment, the ML algorithm may identify patterns (e.g., associated with data distribution) in each attribute included in the ingested historical multi-dimensional dataset. As such, the ML algorithm may train the model to recognize and fit the patterns for each attribute in the ingested historical multi-dimensional dataset. Then, the maintenance program may feed a real-time multi-dimensional dataset including respective multidimensional data points into the trained model to identify the real-time data points that deviate from the multidimensional data points of the historical dataset. If the difference between the real-time dataset and the historical dataset is beyond a given threshold, the deviating real-time data points may be flagged as anomalies that may indicate a potential impairment or damage in the under-floor heating system.

Referring to FIG. 1, an exemplary networked computer environment 100 in accordance with one embodiment is depicted. The networked computer environment 100 may include a client computer 102 with a processor 104 and a data storage device 106 that is enabled to run a software program 108 and a maintenance program 110a. The networked computer environment 100 may also include a server computer 112 that is enabled to run a maintenance program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communication network 116. The communications network 116 may include connections, such as wire, wireless communication links, or fiber optic cables. As will be discussed with reference to FIG. 6, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the maintenance program 110a, 110b may interact with a database 114 that may be embedded in various storage devices, such as, but not limited to a computer/mobile device 102, a networked server 112, or a cloud storage service.

Figure 2:
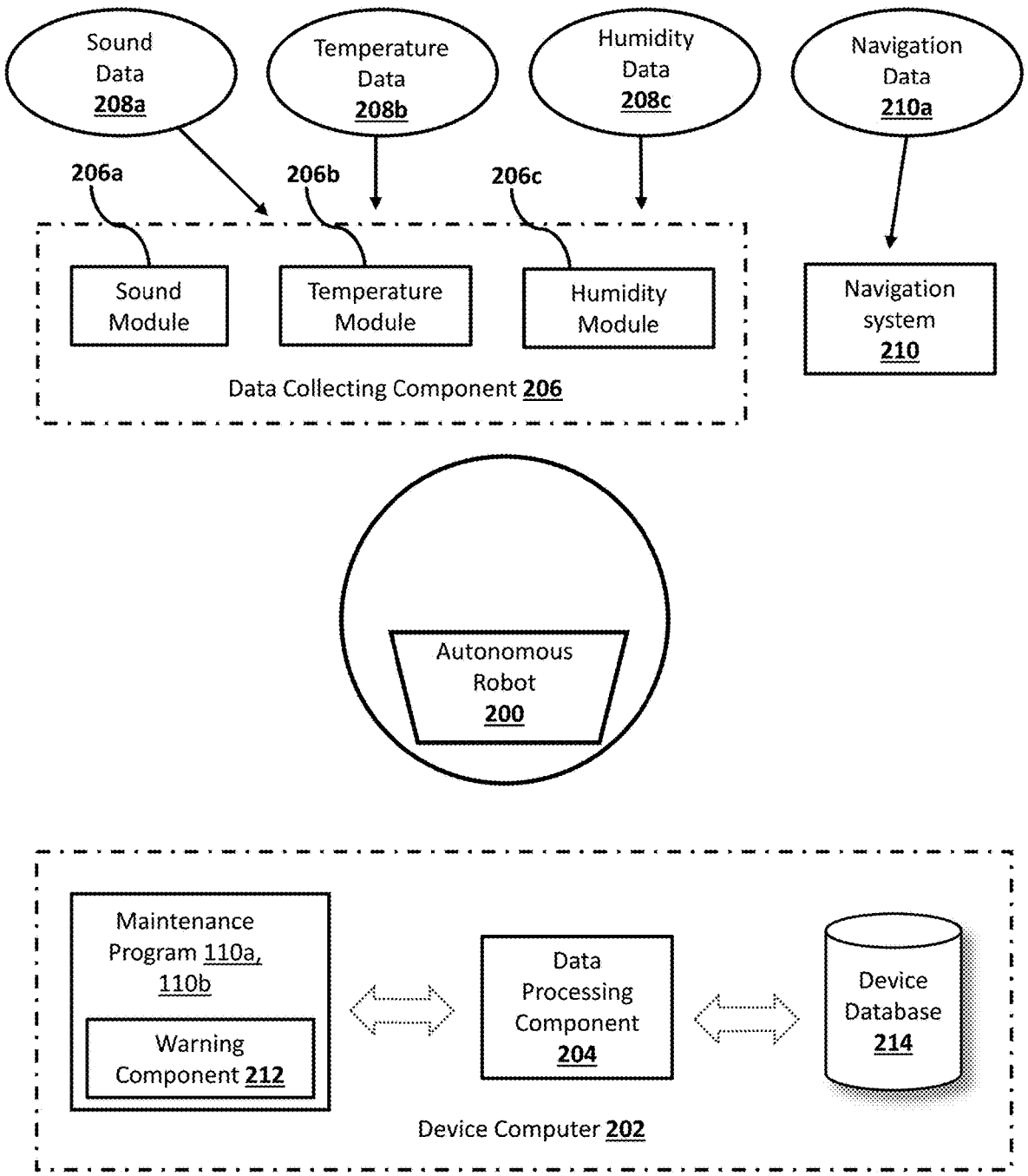
FIG. 2 is an exemplary illustration of an autonomous moving device of the networked computer environment depicted in FIG. 1, according to at least one embodiment.

Referring now to FIG. 2, an exemplary illustration of an autonomous robot 200 in accordance with one embodiment is depicted.

According to one embodiment, the autonomous robot 200 may include a device computer 202 (e.g., special-purpose computer), similar to client computer 102, as depicted in FIG. 1. The device computer 202 may be provided in the networked computer environment 100 and may communicate with the client computer 102 and the server computer 112 via the communication network 116.

Autonomous robot 200 may include an autonomous moving device configured to navigate and work in an environment with minimal user input. In at least one embodiment, the autonomous robot 200 may include an enhanced surface cleaning device, such as a robotic carpet cleaner, a robotic vacuum cleaner, a robotic floor mop, a robotic floor polisher, or another robotic task device. In one embodiment, the autonomous robot 200 may include an under-floor inspection device. In another embodiment, the enhanced surface cleaning device may also perform one or more jobs of the under-floor inspection device.

The autonomous robot 200 may include a chassis configured to house one or more internal components (e.g., device computer 202) therein. In one embodiment, the chassis may be operatively coupled to two or more wheels configured to move the autonomous robot 200. In another embodiment, the autonomous robot 200 may include various tool components (e.g., brush) configured to perform a given task (e.g., cleaning a floor). The autonomous robot 200 may be energized by an external power supply, one or more batteries, or any other power source (e.g., solar).

According to one embodiment, the maintenance program 110a, 110b may be implemented using device computer 202, client computer 102, server computer 112, or any other computing device located within communication network 116, such as a user device (e.g., mobile device, laptop). Further, the maintenance program 110a, 110b may be implemented via distributed operations over multiple computing devices, such as device computer 202, client computer 102, server computer 112, and the user device.

According to one embodiment, device computer 202 of the autonomous robot 200 may include a data processing component 204, a data collecting component 206, a navigation system 210, a warning component 212, and a device database 214. Maintenance program 110a, 110b, running on device computer 202, may be enabled to control the various components and systems therein.

The data processing component 204 may include an embedded processor (e.g., processor 104) or may be capable of receiving inputs from a remote processor (e.g., processor 104) connected via the communication network 116 and configured to run one or more programs, such as the maintenance program 110a, 110b. The device database 214 may be embedded in various storage devices, such as, but not limited to the device computer 202, computer/mobile device 102, networked server 112, or a cloud storage service. The navigation system 210 may include one or more sensors (e.g., position sensor, obstacle sensor, motion sensor) configured to enable the device computer 202 to receive various navigation data 210a for moving and maneuvering the autonomous robot 200 within an environment (e.g., work environment).

The data collecting component 206 may be positioned on the chassis of the autonomous robot 200 (e.g., on a ground-facing portion of the chassis) and be implemented to collect and record various environmental data. In one embodiment, the data collecting component 206 may include a sound module 206a (e.g., for receiving various sound data 208a), a temperature module 206b (e.g., for receiving various temperature data 208b), and a humidity module 206c (e.g., for receiving various humidity data 208c).

As the autonomous robot 200 moves along a surface (e.g., floor) of the environment, the maintenance program 110a, 110b may utilize the sound data 208a received by the sound module 206a to calculate a material of the surface at each position of the autonomous robot 200. In one embodiment, the sound module 206a may include an acoustic sensor (e.g., ultrasonic transducer) configured to emit sound waves (e.g., ultrasound waves) having various frequencies (e.g., greater than approximately 20,000 kilohertz (kHz)). As the sound waves propagate through materials, a portion of the sound waves may transmit through a boundary or interface (e.g., between two materials) and a portion of the sound waves may be reflected back to the sound module 206a (e.g., as sound data 208a). The characteristics of the reflected sound waves (e.g., frequency, amplitude) may be analyzed to calculate the relative acoustic impedance between the two materials, which in turn may be used to calculate a density of each material. As the autonomous robot 200 moves along a surface (e.g., floor of a room), the sound module 206a may detect the reflected sound waves and the data processing component 204 may analyze one or more characteristics of the reflected sound waves to calculate the material at each position of the surface (e.g., wood floor, heating pipes or wire mesh of under-floor heating system). Based on calculating the materials at each position (e.g., from reflected sound waves), the data processing component 204 may construct an image including a layout diagram of the under-floor appliance (e.g., under-floor heating system). As will be further detailed below, in at least one embodiment, the data processing component 204 may identify potential impairments (e.g., cracks, erosion) in the materials at each position of the surface and/or the under-floor appliance and may generate a visualized warning including the positions of the potential impairments electronically localized (e.g., marked) in the layout diagram.

The maintenance program 110a, 110b may utilize the temperature data 208b received by the temperature module 206b (e.g., infrared thermometer) to calculate a surface temperature and/or an under-floor temperature at each position of the autonomous robot 200 in order to detect variations in the temperature across all the positions in the environment. In one embodiment, the maintenance program 110a, 110b may also utilize the temperature data 208b received by the temperature module 206b (e.g., infrared thermometer) to calculate an ambient room temperature. Further, the maintenance program 110a, 110b may utilize the humidity data 208c received by the humidity module 206c (e.g., hygrometer) to calculate a condensation level of the surface and/or the under-floor appliance at each position of the autonomous robot 200 in order to detect variations in the humidity across all the positions in the environment.

As will be further described below, the maintenance program 110a, 110b may utilize the warning component 212 to transmit (e.g., via communication network 116) a notification to a user device (e.g., mobile device, client computer 102) running the maintenance program 110a, 110b. In one embodiment, the maintenance program 110a, 110b running on the user device may receive the notification from the device computer 202 and may render the visualized warning for display on the user device. In one embodiment, the transmitted visualized warning may report the positions of the potential impairments electronically localized (e.g., marked) in the layout diagram generated by the data processing component 204.

According to the present embodiment, maintenance program 110a, 110b may perform real-time detection of potential impairments in an under-floor appliance and may render a visualized warning including the positions of the potential impairments electronically localized (e.g., marked) in a layout diagram of the under-floor appliance. A maintenance analytics method is explained in more detail below with respect to FIGS. 3 to 5.

Figure 3:
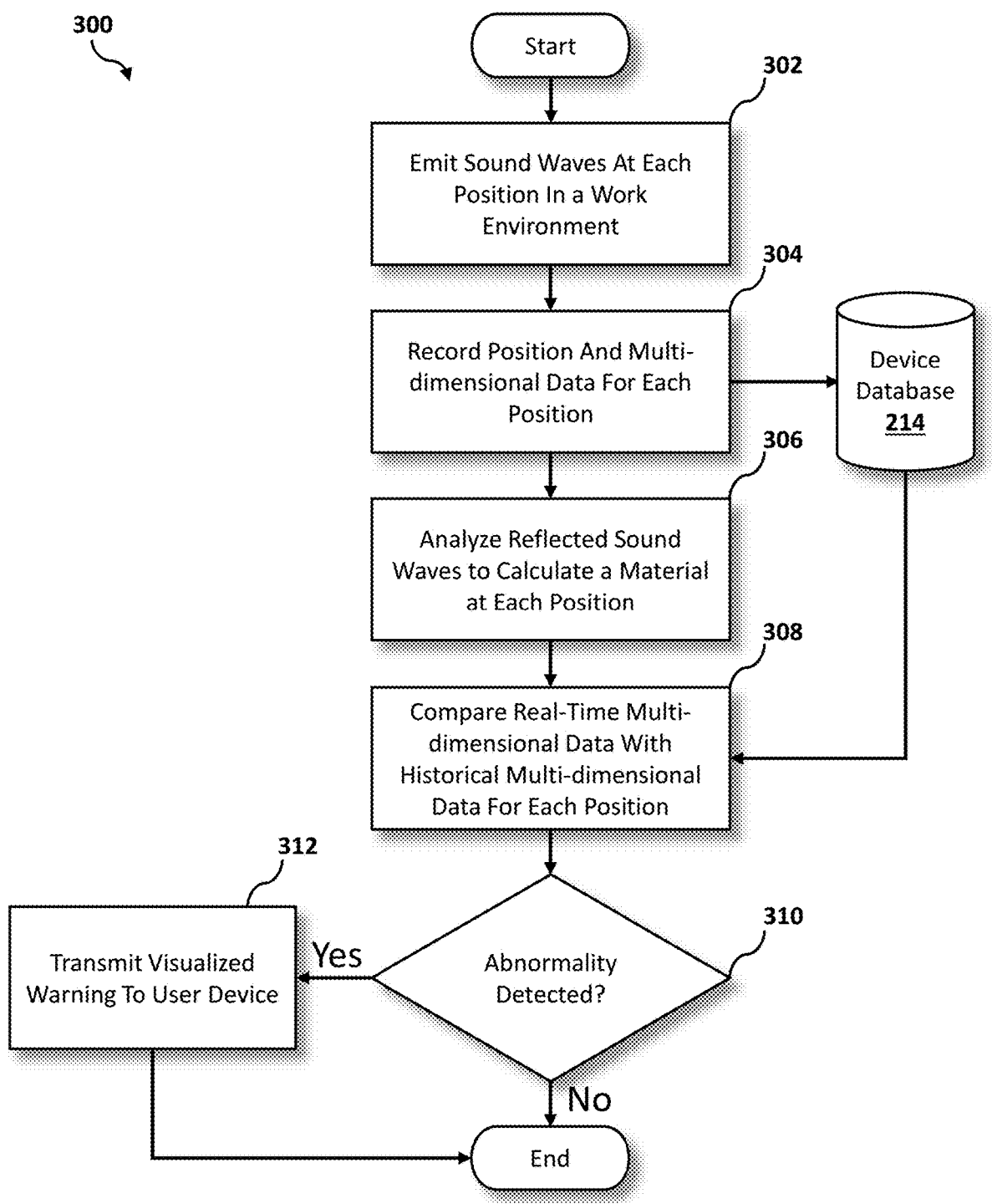
FIG. 3 is an operational flowchart illustrating a process for maintenance analytics according to at least one embodiment.

Referring now to FIG. 3, an operational flowchart illustrating the exemplary maintenance analytics process 300 used by the maintenance program 110a and 110b according to at least one embodiment is depicted.

At 302, sound waves are emitted at each position in a work environment. The maintenance program 110a, 110b running on the device computer 202 (e.g., client computer 102) of the autonomous robot 200 may initiate a work phase in response to receiving a task command from a user. In one embodiment, the maintenance program 110a, 110b running on the user device (e.g., client computer 102) may include a user interface configured to accept commands and data entry from a user. In one embodiment, the commands accepted via the user interface may include commands associated with a task and task-related preferences (e.g., type of task, scheduling of tasks). The user interface provided by the maintenance program 110a, 110b running on the user device may include, for example, a command line interface, a graphical user interface (GUI), a natural user interface (NUI), voice-user interface (VUI), a touch user interface (TUI), or a web-based interface.

Accordingly, in one embodiment, the user may select a button (e.g., "Start Task" button) in the GUI of the user device to initiate the work phase. In response to receiving (e.g., via communication network 116) the task command from the user device, the maintenance program 110a, 110b may engage the autonomous robot 200 to start the work phase. In another embodiment, the maintenance program 110a, 110b may accept commands from the user via a local user interface provided on the autonomous robot 200 (e.g., physical buttons). Accordingly, in response to the user selecting a button (e.g., "start" button) provided on the local user interface of the autonomous robot 200, the maintenance program 110a, 110b may engage the autonomous robot 200 to start the work phase.

The maintenance program 110a, 110b may implement the navigation system 210 to move and maneuver the autonomous robot 200 along a surface (e.g., wood floor) of the work environment. The navigation system 210 may receive navigation data 210a (e.g., via various sensors) from the work environment associated with a position of the autonomous robot 200 as well the presence of obstacles (e.g., furniture) and boundaries (e.g., walls) within the work environment.

As the autonomous robot 200 traverses the work environment, the maintenance program 110a, 110b may implement the sound module 206a to emit a sound wave towards the surface of the work environment at each position of the autonomous robot 200. In one embodiment, the sound module 206a may include an ultrasonic transducer and the maintenance program 110a, 110b may implement the ultrasonic transducer to emit ultrasound waves in the frequency range of approximately 500 kilohertz (KHz) to 5 megahertz (MHz).

In one example, the maintenance program 110a, 110b is implemented in a device computer 202 of an autonomous robot 200, such as a robot vacuum cleaner. The autonomous robot 200 is located in a living room having an under-floor heating system installed therein. User A interacts with a GUI of the maintenance program 110a, 110b running on a mobile device and selects a "Start Cleaning Task" button. The maintenance program 110a, 110b receives the task command from the mobile device, via communication network 116, and implements the navigation system 210 to initiate the work phase of the autonomous robot 200. As the autonomous robot 200 performs the cleaning task and moves along the living room floor, the maintenance program 110a, 110b engages the navigation system 210 to receive navigation data 210a from the living room associated with a position of the autonomous robot 200 and the presence of obstacles and boundaries in the living room. In addition, the maintenance program 110a, 110b engages the sound module 206a to emit ultrasound waves towards the living room floor at each position of the autonomous robot 200.

Then, at 304, a position and multi-dimensional data from each position are recorded. According to one embodiment, the maintenance program 110a, 110b may utilize the data collecting component 206 to collect and record real-time multi-dimensional data at each position of the autonomous robot 200 in the work environment. In one embodiment, the real-time multi-dimensional data may include data across multiple metrics, variables, or attributes, such as a position in the work environment (e.g., the relative position in the room), and a temperature (e.g., surface temperature, under-floor temperature, ambient temperature), humidity, and reflected sound wave characteristics (e.g., sound wave frequency and amplitude) corresponding to each position. In at least one embodiment, the real-time multi-dimensional data may also include a surface (e.g., floor) material and a water flow rate (e.g., through the under-floor heating system) at each position. In another embodiment, the real-time multi-dimensional data may further include an age of the work environment (e.g., age of the house determined from user input via user device).

As the autonomous robot 200 moves within the work environment, the maintenance program 110a, 110b may determine the position of the autonomous robot 200 within the work environment based on the received navigation data 210a. In one embodiment, the navigation system 210 may include one or more motion sensors (e.g., rotary sensor, odometry sensor) operatively coupled to the one or more wheels of the autonomous robot 200. Based on movement data (e.g., navigation data 210a) received from the motion sensors, the navigation system 210 may determine the position of the autonomous robot 200 relative to a starting position. The maintenance program 110a, 110b may record each position of the autonomous robot 200 (determined by the navigation system 210) using a coordinate system, such as a cartesian coordinate system (e.g., using x-axis, y-axis coordinates).

The maintenance program 110a, 110b may engage the temperature module 206b to record the temperature data 208b. In one embodiment, the temperature data 208b may include a surface temperature and/or an under-floor temperature reading for each position in the work environment. In another embodiment, the temperature data 208b may also include an ambient temperature of the work environment. In at least one embodiment, the temperature module 206b may communicate (e.g., via communication network 116) with a remote ambient temperature control device (e.g., thermostat) to determine the ambient temperature of the work environment.

The maintenance program 110a, 110b may engage the humidity module 206c (e.g., hygrometer) to record the humidity data 208c. In one embodiment, the humidity data 208c may indicate an amount of moisture or the condensation level of the surface of the work environment and/or the under-floor appliance at each position. In another embodiment, the humidity data 208c may indicate an ambient humidity of the work environment. In at least one embodiment, the humidity module 206c may communicate (e.g., via communication network 116) with a remote ambient humidity control device to determine the ambient humidity of the work environment.

In response to the sound module 206a (e.g., ultrasonic transducer) emitting a sound wave towards the surface of the work environment at each position, a portion of the sound waves may be reflected back to the sound module 206a. The maintenance program 110a, 110b may engage the sound module 206a to record the sound data 208a associated with the reflected sound wave. The sound data 208a may indicate features or characteristics such as, a frequency and amplitude of the reflected sound wave. In one embodiment, the sound data 208a may also be utilized to determine (e.g., via the data processing component 204) the water flow rate at each position.

For each position of the autonomous robot 200 in the work environment, the maintenance program 110a, 110b may communicate with the device database 214 (e.g., via communication network 116) to store the position and the real-time multi-dimensional data recorded at the corresponding position.

Continuing with the previous example, as the autonomous robot 200 moves through the living room performing the cleaning work, for each position P, the maintenance program 110a, 110b utilizes the navigation data 210a received from the navigation system 210 to record each position Pd to $P_{n-1}$ using (x, y) coordinates where n is the total number of positions in trajectory of the autonomous robot 200 as the autonomous robot 200 moves through the living room. In addition, the maintenance program 110a, 110b engages the temperature module 206b to collect the temperature data 208b for the under-floor heating system at each position $P_0$ to $P_{n-1}$. Accordingly, the maintenance program 110a, 110b utilizes the temperature data 208b received from the temperature module 206b to record an under-floor heating temperature FT for each position $P_0$ to $P_{n-1}$ in the living room. In addition, the maintenance program 110a, 110b utilizes the temperature module 206b to determine an ambient temperature AT in the living room.

Further, the maintenance program 110a, 110b engages the humidity module 206c to collect the humidity data 208c for the living room floor at each position $P_0$ to $P_{n-1}$. The maintenance program 110a, 110b utilizes the humidity data 208c received from the humidity module 206c to record a floor humidity FH for each position $P_0$ to $P_{n-1}$ in the living room. Further, the maintenance program 110a, 110b engages the sound module 206a to collect the sound data 208a associated with the reflected sound wave at each position $P_0$ to $P_{n-1}$. The maintenance program 110a, 110b utilizes the sound data 208a received from the sound module 206a to record a reflected sound wave RS for each position $P_0$ to $P_{n-1}$ in the living room. The maintenance program 110a, 110b further utilizes the sound data 208a received from the sound module 206a to determine and record a floor material FM and a water flow rate WF for each position $P_0$ to $P_{n-1}$ in the living room. Further, the maintenance program 110a, 110b receives, via communication network 116, a user input from the mobile device indicating that living room is located in a 50-year-old house.

Thereafter, the maintenance program 110a, 110b communicates with the device database 214 via communication network 116 and stores each position $P_0$ to $P_{n-1}$ along with the corresponding recorded under-floor heating temperature FT, floor humidity FH, reflected sound wave RS, floor material FM, and water flow rate WF. In addition, the maintenance program 110a, 110b stores the ambient temperature (AT) of the living room as well as the age of the house.

Then, at 306, the reflected sound waves are analyzed to calculate a material at each position. After emitting the sound waves (e.g., ultrasound frequency) from the sound module 206a (e.g., ultrasonic transducer) and recording the reflected sound waves, the maintenance program 110a, 110b may engage the data processing component 204 to analyze the reflected sound waves and calculate the material (e.g., material composition, structural composition) at each position of the surface and under the surface based on one or more characteristics of the reflected sound waves (e.g., frequency, amplitude). By measuring the characteristics of the reflected sound waves, the data processing component 204 may determine if the material under the surface at each position is a component (e.g., heating pipe, heating tube, wire mesh) associated with the under-floor heating system. After analyzing the reflected sound waves at each position, the data processing component 204 may generate a layout diagram (e.g., planar graph of under-floor heating system layout) of the under-floor heating system. In one embodiment, the maintenance program 110a, 110b may utilize the navigation data 210a received from the navigation system 210 to construct a map or floor plan of the work environment. Thereafter, the maintenance program 110a, 110b may incorporate the floor plan of the work environment with the layout diagram to provide a planar graph of the under-floor heating system layout localized within the floor plan of the work environment.

Continuing with the previous example, the maintenance program 110a, 110b engages the data processing component 204 to analyze the reflected sound waves RS at each position $P_0$ to $P_n$ in the living room. After filtering out the noise in the reflected sound waves RS, the data processing component 204 measures the frequency and amplitude characteristics of the reflected sound waves RS at each position $P_0$ to $P_n$ and detects rows of cross-linked polyethylene (PEX) tubes associated with a hydronic heating system installed under the living room floor. Thereafter, the maintenance program 110a, 110b implements the data processing component 204 to generate a layout diagram including the layout of the detected PEX tubes localized within a floor plan of the living room.

Then, at 308, a real-time multi-dimensional dataset is compared with a historical multi-dimensional dataset for each position. After collecting the real-time multi-dimensional dataset from each position in the work environment, the maintenance program 110a, 110b may compare the collected real-time multi-dimensional dataset with the historical multi-dimensional dataset corresponding to the same work environment. In order to perform the comparison between the real-time multi-dimensional dataset and the historical multi-dimensional dataset, the maintenance program 110a, 110b may designate the historical multi-dimensional dataset as indicating a normal condition (e.g., baseline measure) of the under-floor heating system. Based on the comparison, the maintenance program 110a, 110b may detect abnormalities or anomalies in the real-time multi-dimensional dataset which may indicate, in real-time, potential impairments or damages in the under-floor heating system that may lead to failure in the under-floor heating system.

According to one embodiment, the maintenance program 110a, 110b may utilize a machine learning (ML) algorithm and the historical multi-dimensional dataset in order to learn the parameters of the normal condition associated with the under-floor heating system. In one embodiment, prior to engaging in the working phase at 302, the maintenance program 110a, 110b may implement an observation phase and a training phase.

The observation phase may include a pre-determined time period (e.g., 7 days) during which the maintenance program 110a, 110b may implement the data collecting component 206 to collect and record multi-dimensional data at each position of the working environment. In one embodiment, the pre-determined time period for the observation phase may be program-defined by the maintenance program 110a, 110b. In another embodiment, the pre-determined time period for the observation phase may be user-defined via the user device.

During the observation phase, the maintenance program 110a, 110b may communicate with the device database 214 (e.g., via communication network 116) to store the multi-dimensional data for each position as the historical multi-dimensional dataset. According to one embodiment, the maintenance program 110a, 110b may collect, record, and store the historical multi-dimensional dataset in a manner that may be similar to the process described at 304 with reference to the real-time multi-dimensional dataset.

In one embodiment, the historical multi-dimensional dataset may include data across multiple metrics, variables, or attributes, such as a position in the work environment (e.g., the relative position in the room), and a temperature (e.g., surface temperature, under-floor temperature, ambient temperature), humidity, and reflected sound wave characteristics (e.g., sound wave frequency and amplitude) corresponding to each position. In at least one embodiment, the historical multi-dimensional data may also include a surface (e.g., floor) material and a water flow rate (e.g., through the under-floor heating system) at each position. In another embodiment, the historical multi-dimensional data may further include an age of the work environment (e.g., age of the house determined from user input via user device).

Following the pre-determined time period of the observation phase, the maintenance program 110a, 110b may initiate the training phase. According to one embodiment, the maintenance program 110a, 110b may retrieve (e.g., via communication network 116) the historical multi-dimensional dataset from the device database 214 and may then feed or input the historical multi-dimensional dataset into the ML algorithm. In response, the ML algorithm may construct a model that may represent the ingested historical multi-dimensional dataset. In one embodiment, the ML algorithm may identify patterns (e.g., associated with data distribution) in each attribute (e.g., under-floor temperature, humidity, reflected sound wave characteristics) included in the ingested historical multi-dimensional dataset. As such, the ML algorithm may train the model to recognize and fit the patterns for each attribute in the ingested historical multi-dimensional dataset. According to one embodiment, the maintenance program 110a, 110b may retrieve domain knowledge associated with the under-floor heating system (e.g., normal operating temperature range) from a knowledge source (e.g., remote knowledge database) via communication network 116. The domain knowledge may be fed into the ML algorithm in addition to the historical multi-dimensional dataset in order to improve the ability of the trained model to detect abnormalities or anomalies in the real-time multi-dimensional dataset.

During the working phase, the maintenance program 110a, 110b may utilize the trained model (representing the historical multi-dimensional dataset) when comparing the real-time multi-dimensional dataset with the historical multi-dimensional dataset at 308. Specifically, the maintenance program 110a, 110b may retrieve (e.g., via communication network 116) the real-time multi-dimensional dataset from the device database 214. Then, the maintenance program 110a, 110b may feed or input the real-time multi-dimensional dataset into the trained model to identify, for each position, the attributes (e.g., temperature, humidity) in the real-time multi-dimensional dataset that deviate from the historical multi-dimensional dataset. Then, the maintenance program 110a, 110b may calculate a deviation value (e.g., a degree of deviation between the real-time multi-dimensional dataset and the historical multi-dimensional dataset) for each attribute at each position. In one embodiment, the maintenance program 110a, 110b may calculate and return a risk score for each position, based on a sum of the deviation values in the respective position.

Continuing with the previous example, after user A first installs the autonomous robot 200, the maintenance program 110a, 110b implements the observation phase for the program-defined time period of seven days. During the observation phase, the maintenance program 110a, 110b implements the data collecting component 206 to collect and record multi-dimensional data at each position $P_0$ to $P_{n-1}$ in the living room. Thereafter, the maintenance program 110a, 110b communicates with the device database 214 via communication network 116 and stores (as the historical multi-dimensional dataset) each position $P_0$ to $P_{n-1}$ along with the corresponding recorded under-floor heating temperature FT, floor humidity FH, reflected sound wave RS, floor material FM, and water flow rate WF. In addition, the maintenance program 110a, 110b stores the ambient temperature AT of the living room as well as the age of the house (50 years old).

Following the observation phase, the maintenance program 110a, 110b initiates the training phase and feeds the historical multi-dimensional dataset (retrieved from the device database 214 via communication network 116) into the ML algorithm. In response, the ML algorithm constructs and trains a model to represent the ingested historical multi-dimensional dataset.

During the working phase, the maintenance program 110a, 110b feeds the real-time multi-dimensional dataset (retrieved from the device database 214 via communication network 116) into the trained model. In response, the trained model calculates the deviation value for each attribute at each position $P_0$ to $P_{n-1}$ in the living room. Then, the maintenance program 110a, 110b calculates the sum of the deviation values for each position $P_0$ to $P_{n-1}$ in the living room and returns a respective risk score for each position $P_0$ to $P_{n-1}$ in the living room.

Thereafter, at 310, the maintenance program 110a, 110b determines whether an abnormality is detected in any of the positions. Not every deviation between the real-time multi-dimensional dataset and the historical multi-dimensional dataset may indicate a potential impairment or damage in the under-floor heating system that may lead to failure of the under-floor heating system. Accordingly, in order to improve the prediction quality of the trained model, the maintenance program 110a, 110b may set a risk threshold value. The risk threshold value may be a value within a range of the risk scores that may be configured to trigger the detection of an abnormality. In one embodiment, the risk scores may include a score range between 0-100 and the risk threshold value may, for example be a risk score of 75 out of 100. In at least one embodiment, the maintenance program 110a, 110b may implement any suitable score range for the risk scores and a program-defined risk threshold value. In another embodiment, the maintenance program 110a, 110b may provide the user with an option (e.g., via user interface in user device) to select a user-defined risk threshold value. According to one embodiment, the maintenance program 110a, 110b may assign different risk threshold values for some or all of the attributes of the multi-dimensional dataset (e.g., risk threshold value of 50 out of 100 for under-floor temperature and risk threshold value of 80 out of 100 for ambient temperature). In another embodiment, the maintenance program 110a, 110b may implement a dynamic risk threshold value corresponding to the life-span of the under-floor heating system (e.g., an older under-floor heating system may include a lower risk threshold value).

If the returned risk score for a given position is less than the risk threshold value at 310, the maintenance program 110a, 110b may determine that an abnormality is not detected for the given position. The maintenance program 110a, 110b may perform this inquiry for every position in the work environment.

Continuing with the previous example, the maintenance program 110a, 110b implements a risk score range between 0-100 and sets a risk threshold value of 75 out of 100. The maintenance program 110a, 110b calculates the sum of the deviation values for position Pi in the living room and returns a risk score of 35 out of 100 for position Pi in the living room. Thereafter, the maintenance program 110a, 110b determines that an abnormality is not detected at position Pi because the risk score of 35 is less than the risk threshold value of 75. Accordingly, the maintenance program 110a, 110b continues to perform this inquiry for the remaining positions in the living room.

However, if the returned risk score for a given position is greater than the risk threshold value at 310, the maintenance program 110a, 110b may determine that an abnormality is detected at the given position. In one embodiment, the maintenance program 110a, 110b may register the position including the detected abnormality and continue the inquiry for the remaining positions in the work environment.

Continuing with the previous example, the maintenance program 110a, 110b returns a risk score of 80 out of 100 for position $P_{13}$ in the living room. Thereafter, the maintenance program 110a, 110b determines that an abnormality is detected at position $P_{13}$ because the risk score of 80 is greater than the risk threshold value of 75. The maintenance program 110a, 110b registers the position $P_{13}$ in the living room as including a detected abnormality and continues the inquiry for the remaining positions in the living room.

Thereafter, if at 310, the maintenance program 110a, 110b determines that the abnormality is detected, then at 312, a visualized warning is transmitted to a user device. The maintenance program 110a, 110b may utilize the warning component 212 to transmit (e.g., via communication network 116) a notification of the visualized warning to a user device (e.g., mobile device, client computer 102) running the maintenance program 110a, 110b. In one embodiment, the maintenance program 110a, 110b running on the user device may receive the notification from the device computer 202 and may render the visualized warning for display on the user device using the GUI of the maintenance program 110a, 110b.

The maintenance program 110a, 110b may implement the data processing component 204 to generate the visualized warning including the positions of the detected abnormalities (from step 310) electronically localized (e.g., marked) in the layout diagram. In one embodiment, the maintenance program 110a, 110b may determine the potential impairment to the under-floor heating system indicated by the detected abnormality (e.g., based on the attribute having the highest risk score). In one embodiment, the visualized warning may include a textual description of the potential impairments indicated by the detected abnormalities. In one embodiment, the textual description of the potential impairment may include a link (e.g., hyperlink) to the electronically localized position of the corresponding abnormality in the layout diagram of the under-floor heating system.

According to one embodiment, the maintenance program 110a, 110b may implement the data processing component 204 to generate a graphical heat map based on the risk score corresponding to the real-time under-floor temperature at each position of the autonomous robot 200 in the work environment. The graphical heat map may provide a visualization of the potential impairments associated with the under-floor temperature, where a lighter color may indicate a lower risk score range and a deeper color may indicate a higher risk score range. In one embodiment, the maintenance program 110a, 110b may include the graphical heat map in the visualized warning transmitted to the user device. The maintenance program 110a, 110b may provide the user with an option (e.g., via a button in the GUI) to view the graphical heat map. In response to the user selecting the option to view the graphical heat map, the maintenance program 110a, 110b may render the graphical heat map to be superimposed on the layout diagram of the under-floor heating system. In at least one embodiment, the maintenance program 110a, 110b may also implement the data processing component 204 to generate a graph of the risk scores corresponding to other individual attributes of the multi-dimensional dataset.

Continuing with the previous example, the maintenance program 110a, 110b running in the device computer 202 of the autonomous robot 200 utilizes the warning component 212 to transmit, via communication network 116, a notification of the visualized warning to the mobile device of user A. The maintenance program 110a, 110b running on the mobile device receives the notification from the device computer 202 and renders the visualized warning for display on a display of the mobile device using the GUI of the maintenance program 110a, 110b. The visualized warning includes a textual description of the potential impairment to the under-floor heating system: "Water Leakage-2 Locations." In response to the user A selecting the textual description of the potential impairment, the maintenance program 110a, 110b renders, on the display of the mobile device, the layout diagram of the under-floor heating system including two electronically localized positions of the potential water leak impairment in the under-floor heating system.

Figure 4:
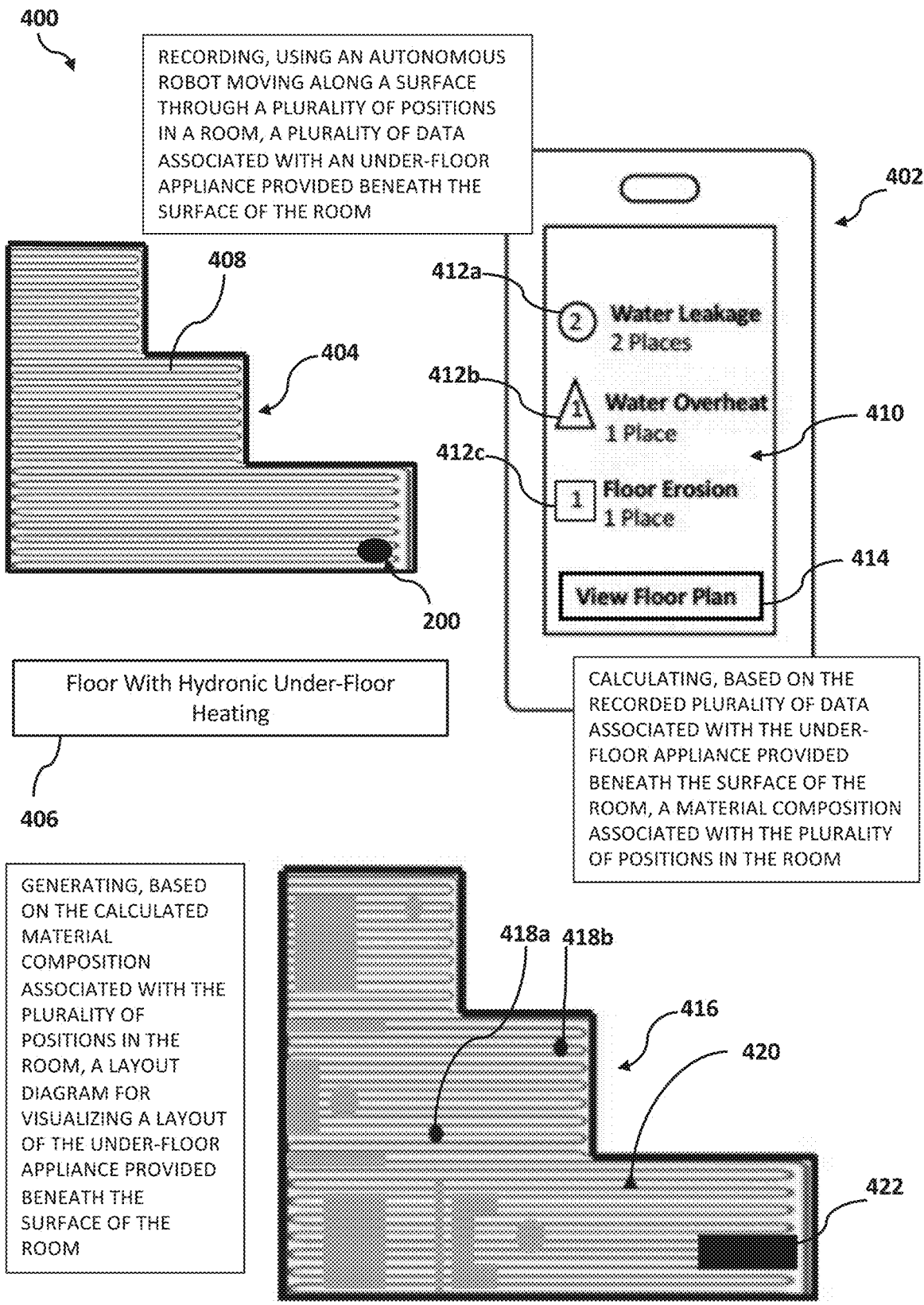
FIG. 4 is a block diagram illustrating a first exemplary maintenance analytics process implemented by a maintenance program according to at least one embodiment.

Referring now to FIG. 4, a block diagram illustrating a first exemplary maintenance analytics process 400 implemented by a maintenance program 110a, 110b according to at least one embodiment is depicted. In at least one embodiment, process 400 of FIG. 4 illustrates recording, using an autonomous robot moving along a surface through a plurality of positions in a room, a plurality of data associated with an under-floor appliance provided beneath the surface of the room, as will be discussed below. In at least one embodiment, process 400 of FIG. 4 also illustrates calculating, based on the recorded plurality of data associated with the under-floor appliance provided beneath the surface of the room, a material composition associated with the plurality of positions in the room, as will be discussed below. In at least one embodiment, process 400 of FIG. 4 further illustrates generating, based on the calculated material composition associated with the plurality of positions in the room, a layout diagram for visualizing a layout of the under-floor appliance provided beneath the surface of the room, as will be discussed below.

A user B may schedule a daily cleaning task for the autonomous robot 200 by interacting with a GUI provided by the maintenance program 110a, 110b running on a mobile device 402. While performing the scheduled cleaning task in a room 404, the maintenance program 110a, 110b implemented in the autonomous robot 200 may initiate the work phase as previously described at 302. Specifically, as the autonomous robot 200 traverses the room 404, the maintenance program 110a, 110b may implement the sound module 206a to emit ultrasound waves towards a floor 406 including a hydronic under-floor heating system installed thereunder. The maintenance program 110a, 110b may utilize the data collecting component 206 of the autonomous robot 200 to collect and record real-time multi-dimensional data at each position in a trajectory of the autonomous robot 200 in the room 404 as previously described at 304. As part of the real-time multi-dimensional dataset, the maintenance program 110a, 110b may utilize the data collecting component 206 to collect and record a temperature (e.g., surface temperature, under-floor temperature, ambient temperature), humidity, and reflected sound wave characteristics (e.g., sound wave frequency and amplitude) corresponding to each position as previously described at 304. Thereafter, the maintenance program 110a, 110b may store the real-time multi-dimensional dataset and the corresponding position in the device database 214 as previously described at 304.

After analyzing the reflected sound waves at each position of the floor 406 in the room 404, the data processing component 204 may detect rows of PEX tubes 408 associated with the hydronic under-floor heating system installed in the room 404. Thereafter, the maintenance program 110a, 110b may implement the data processing component 204 to generate a layout diagram of the PEX tubes 408 localized within a floor plan of the room 404 as previously described at 306.

Based on a comparison of the real-time multi-dimensional dataset and the historical multi-dimensional dataset from each position of the room 404, as previously described at 308, the maintenance program 110a, 110b identifies three positions in the room 404 which include detected abnormalities and the corresponding potential impairments as previously described at 310. The maintenance program 110a, 110b may utilize the warning component 212 to transmit (e.g., via communication network 116) a notification of a visualized warning 410 to the mobile device 402 running the maintenance program 110a, 110b as previously described at 312. The visualized warning 410 includes a first text box 412a describing a first potential impairment ("Water Leakage") in two positions in the room 404, a second text box 412b describing a second potential impairment ("Water Overheat") in one position in the room 404, and a third text box 412c describing a third potential impairment ("Floor Erosion") in one position in the room 404. The visualized warning 410 may also include a "View Floor Plan" button 414. After the user B selects the "View Floor Plan" button 414, the GUI of the maintenance program 110a, 110b renders, on the display of the mobile device 402, a layout diagram 416 of the hydronic under-floor heating system including two electronically localized positions 418a, 418b corresponding to the first potential impairment ("Water Leakage"), one electronically localized position 420 corresponding to the second potential impairment ("Water Overheat"), and one electronically localized position 422 corresponding to the third potential impairment ("Floor Erosion"). In one embodiment, the text box description of the potential impairment and the associated electronically localized position may include corresponding shapes or icons (e.g., circles, triangles, rectangles) to enable user B to quickly draw a visual connection between the text box description and the corresponding electronically localized position in the layout diagram 416.

Figure 5:
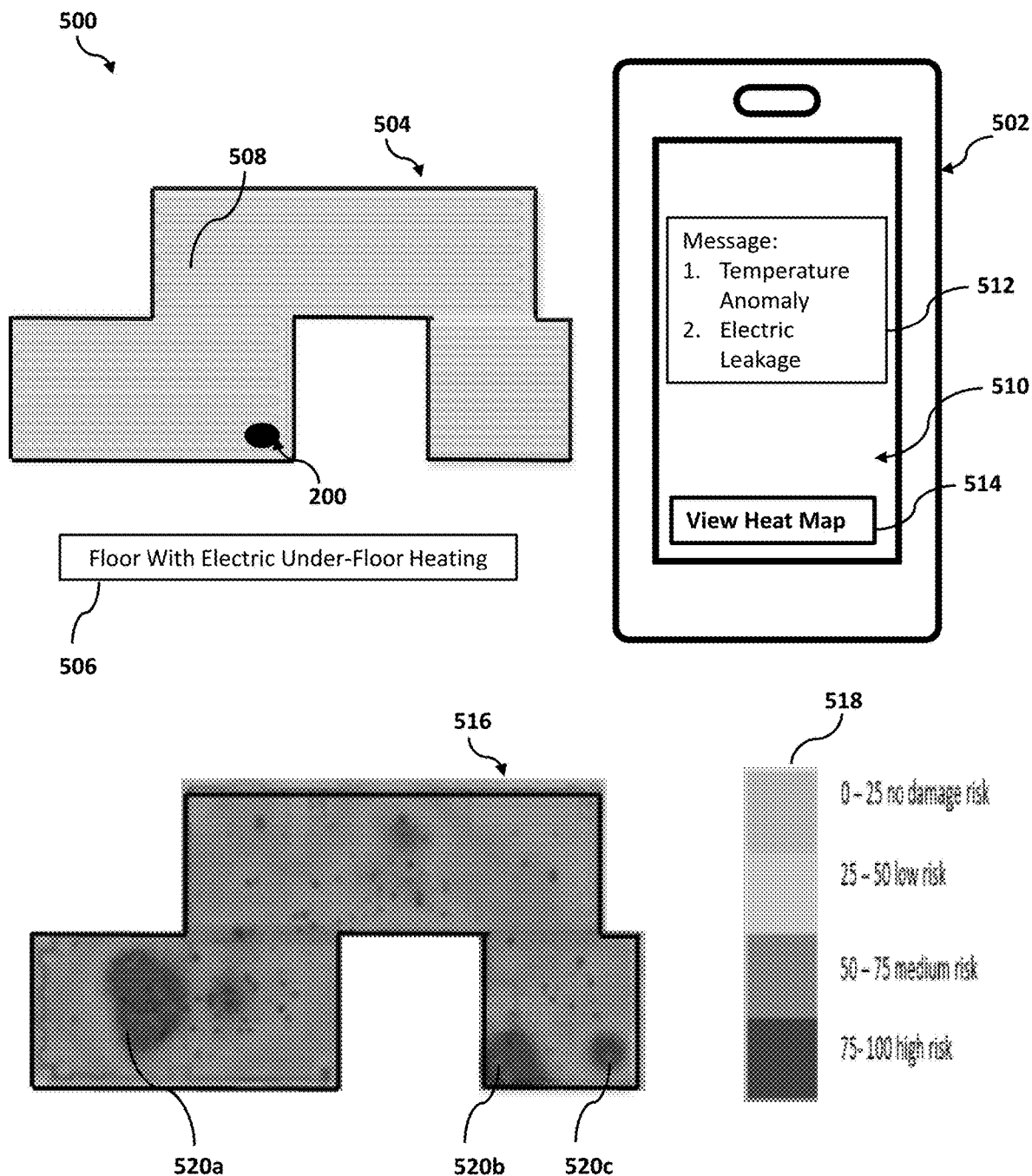
FIG. 5 is a block diagram illustrating a second exemplary maintenance analytics process implemented by a maintenance program according to at least one embodiment.

Referring now to FIG. 5, a block diagram illustrating a second exemplary maintenance analytics process 500 implemented by a maintenance program 110a, 110b according to at least one embodiment is depicted.

In response to a task command from a mobile device 502, the maintenance program 110a, 110b implemented in the autonomous robot 200 may initiate the work phase in a room 504 as previously described at 302. At each position in a trajectory of the autonomous robot 200 in the room 504, the maintenance program 110a, 110b may utilize the data collecting component 206 of the autonomous robot 200 to collect and record real-time multi-dimensional data including temperature (e.g., surface temperature, under-floor temperature, ambient temperature), humidity, and reflected sound wave characteristics (e.g., sound wave frequency and amplitude) as previously described at 304.

After analyzing the reflected sound waves at each position of a floor 506 in the room 504, the data processing component 204 may detect rows of electrical wires 508 corresponding to an electric under-floor heating system installed in the room 504. Thereafter, the maintenance program 110a, 110b may implement the data processing component 204 to generate a layout diagram of the electrical wires 508 localized within a floor plan of the room 504 as previously described at 306.

Based on a comparison of the real-time multi-dimensional dataset and the historical multi-dimensional dataset from each position of the room 504, as previously described at 308, the maintenance program 110a, 110b identifies two detected abnormalities corresponding to potential temperature-related impairments as previously described at 310. The maintenance program 110a, 110b may utilize the warning component 212 to transmit (e.g., via communication network 116) a notification of a visualized warning 510 to the mobile device 502 running the maintenance program 110a, 110b as previously described at 312.

In one embodiment, the visualized warning 510 includes a text box 512 describing the potential temperature-related impairments ("Temperature Anomaly and Electric Leakage") and an option to view a graphical heat map 516 by selecting a "View Heat Map" button 514. The maintenance program 110a, 110b may implement the data processing component 204 to generate the graphical heat map 516 based on the risk score corresponding to the real-time under-floor temperature at each position of the autonomous robot 200 in the room 504. The graphical heat map 516 may provide a visualization of the potential temperature-related impairments, where a lighter color may indicate a lower risk score range and a deeper color may indicate a higher risk score range, as previously described at 312. In at least one embodiment, the graphical heat map 516 may include a legend 518 that may associate various colors to corresponding range risks.

In response to the user selecting the "View Heat Map" button 514, the maintenance program 110a, 110b renders the graphical heat map 516 to be superimposed on a layout diagram of the electrical wires 508 of the electric under-floor heating system. Based on the graphical heat map 516 and the legend 518, user C identifies three positions 520a, 520b, 520c in the room 504 that indicate the highest risk score range ("75-100") for the potential temperature-related impairments described in text box 512.

The functionality of a computer may be improved by the maintenance program 110a, 110b because the maintenance program 110a, 110b may enable an autonomous moving robot to perform a user assigned task and simultaneously collect real-time multi-dimensional data corresponding to the maintenance of an under-floor appliance. The maintenance program 110a, 110b may utilize a ML algorithm to detect abnormalities or anomalies in the real-time multidimensional data which may indicate, in real-time, potential impairments or damages in the under-floor appliance that may lead to actual failure in the under-floor appliance. The maintenance program 110a, 110b may provide more improvements to the functionality of a computer by utilizing reflected sound wave data recorded by the autonomous moving robot to automatically generate a layout diagram of an under-floor appliance layout within an environment. If abnormalities or anomalies are detected in the under-floor appliance, the maintenance program 110a, 110b may alert users with a visualized warning including the positions of the potential impairments electronically localized (e.g., marked) in the layout diagram of the under-floor appliance. Thus, the maintenance program 110a, 110b may enable users to repair the potential impairments in the under-floor appliance before actual failure of the under-floor appliance, which may be time-consuming and relatively more expensive.

It may be appreciated that FIGS. 2 to 5 provide only an illustration of one embodiment and do not imply any limitations with regard to how different embodiments may be implemented. Many modifications to the depicted embodiment(s) may be made based on design and implementation requirements.

Figure 6:
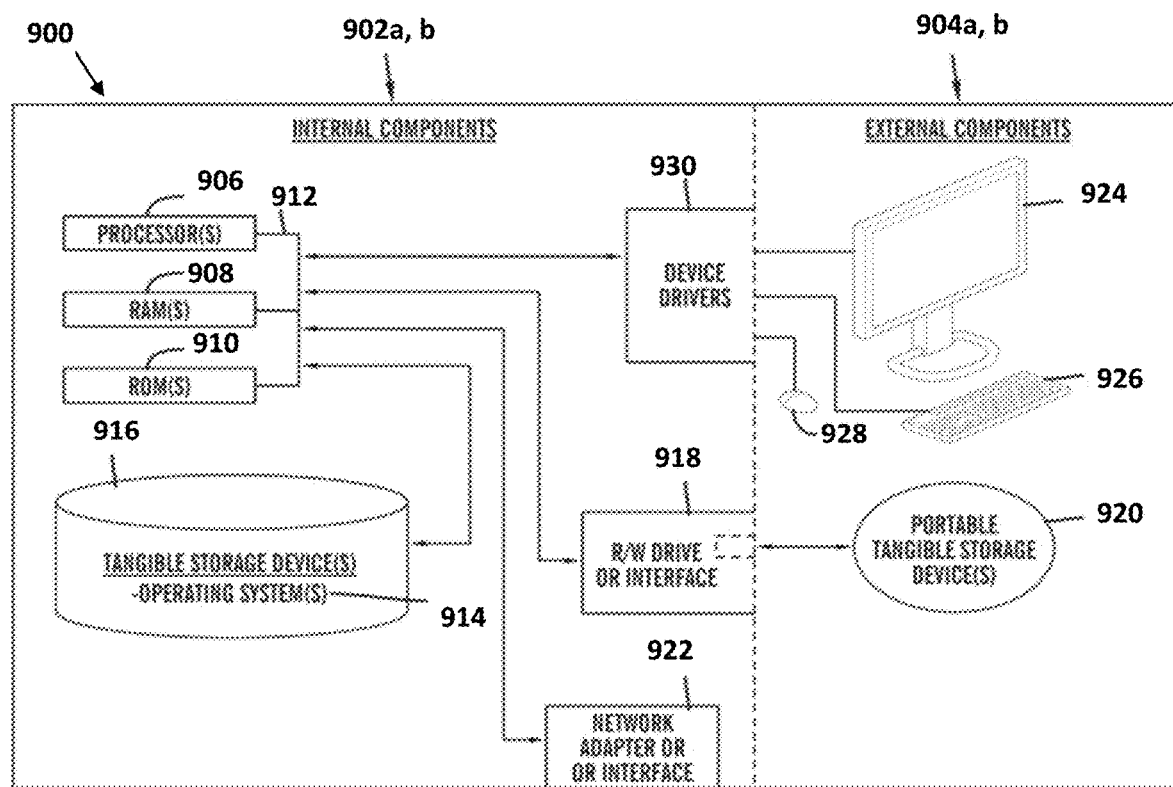
FIG. 6 is a block diagram of internal and external components of computers and servers depicted in FIG. 1 according to at least one embodiment.

FIG. 6 is a block diagram 900 of internal and external components of computers depicted in FIG. 1 in accordance with an illustrative embodiment of the present invention. It should be appreciated that FIG. 6 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 6. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108 and the maintenance program 110a in client computer 102, and the maintenance program 110b in network server 112, may be stored on one or more computer-readable tangible storage devices 916 for execution by one or more processors 906 via one or more RAMs 908 (which typically include cache memory). In the embodiment illustrated in FIG. 6, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the maintenance program 110a and 110b can be stored on one or more of the respective portable computer-readable tangible storage devices 920, read via the respective R/W drive or interface 918 and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 and the maintenance program 110a in client computer 102 and the maintenance program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the maintenance program 110a in client computer 102 and the maintenance program 110b in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
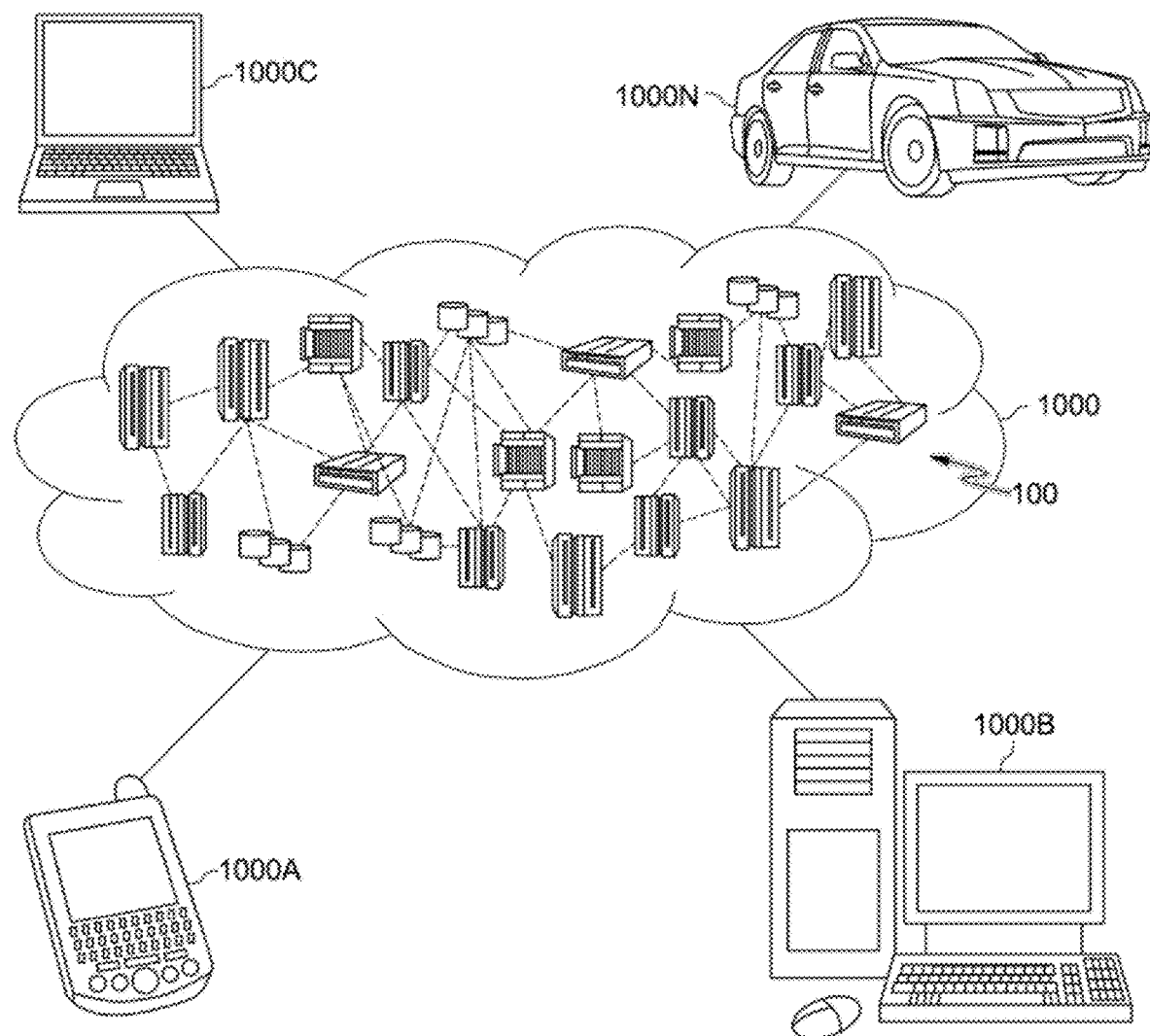
FIG. 7 is a block diagram of an illustrative cloud computing environment including the computer system depicted in FIG. 1, in accordance with an embodiment of the present disclosure.

Referring now to FIG. 7, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 7 are intended to be illustrative only and that computing nodes 100 and cloud computing environment 1000 can communicate with any type of computerized device over any type of network and/or network addressable connection (e.g., using a web browser).

Figure 8:
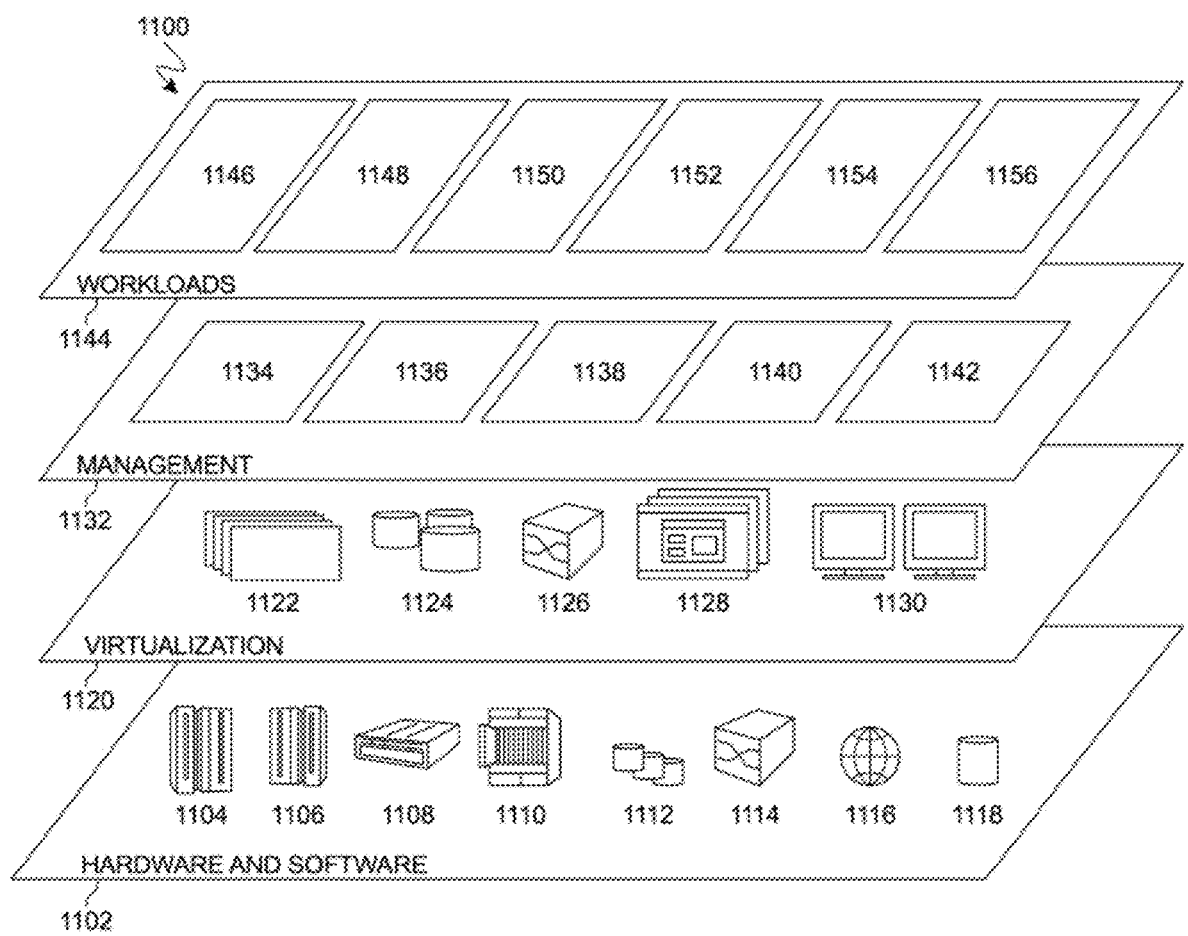
FIG. 8 is a block diagram of functional layers of the illustrative cloud computing environment of FIG. 7, in accordance with an embodiment of the present disclosure.

Referring now to FIG. 8, a set of functional abstraction layers 1100 provided by cloud computing environment 1000 is shown. It should be understood in advance that the components, layers, and functions shown in FIG. 8 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and predictive maintenance 1156. A maintenance program 110a, 110b provides a way to perform real-time detection of potential impairments in an under-floor appliance and render a visualized warning including the positions of the potential impairments electronically localized (e.g., marked) in a layout diagram of the under-floor appliance.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for predictive maintenance, the method comprising:
   recording, using an autonomous robot moving along a surface through a plurality of positions in a room, a plurality of data associated with an under-floor appliance provided beneath the surface of the room;
   calculating, based on the recorded plurality of data associated with the under-floor appliance provided beneath the surface of the room, a material composition associated with the plurality of positions in the room; and
   generating, based on the calculated material composition associated with the plurality of positions in the room, a layout diagram for visualizing a layout of the under-floor appliance provided beneath the surface of the room.

2. The method of claim 1, further comprising:
   in response to comparing the recorded plurality of data associated with the under-floor appliance provided beneath the surface of the room and a corresponding plurality of baseline data associated with the under-floor appliance provided beneath the surface of the room, calculating a deviation in the recorded plurality of data relative to the plurality of baseline data; and
   detecting, based on the calculated deviation in the recorded plurality of data relative to the plurality of baseline data, an abnormality in the recorded plurality of data associated with the under-floor appliance, wherein the detected abnormality in the recorded plurality of data associated with the under-floor appliance is indicative of a potential impairment in the under-floor appliance.

3. The method of claim 1, further comprising:
   training a machine learning (ML) algorithm to detect an abnormality in the recorded plurality of data associated with the under-floor appliance provided beneath the surface of the room based on learning at least one parameter corresponding to an observed normal condition of the under-floor appliance provided beneath the surface of the room;
   detecting, using the trained ML algorithm, the abnormality in the recorded plurality of data associated with the under-floor appliance provided beneath the surface of the room;
   transmitting, from the autonomous robot to a user device, a visualized warning including a position of the detected abnormality electronically localized in the generated layout diagram for visualizing the layout of the under-floor appliance provided beneath the surface of the room.

4. The method of claim 1, wherein calculating the material composition associated with the plurality of positions in the room further comprises:
   processing, using a data processing component of the autonomous robot, a plurality of sound waves reflected from the surface of the room;
   analyzing, using the data processing component of the autonomous robot, at least one characteristic of the plurality of processed sound waves reflected from the surface of the room; and
   determining, using the data processing component of the autonomous robot, the material composition associated with the plurality of positions in the room based on the at least one analyzed characteristic of the plurality of processed sound waves reflected from the surface of the room.

5. The method of claim 1, wherein recording the plurality of data associated with the under-floor appliance provided beneath the surface of the room further comprises:
   in response to receiving a task command from a user device, performing, using a tool component of the autonomous robot, the received task command; and
   simultaneously recording, using a data collecting component of the autonomous robot, a plurality of real-time data associated with the under-floor appliance provided beneath the surface of the room.

6. The method of claim 1, further comprising:
   recording, using a temperature module of the autonomous robot, a plurality of real-time temperature data associated with the under-floor appliance provided beneath the surface of the room;
   in response to comparing the plurality of recorded real-time temperature data associated with the under-floor appliance and a corresponding plurality of baseline temperature data associated with the under-floor appliance, calculating a plurality of risk scores based on a deviation in the plurality of recorded real-time temperature data relative to the plurality of baseline temperature data;
   generating, based on the plurality of calculated risk scores, a graphical heat map for visualizing at least one potential temperature-related impairment in the under-floor appliance associated with the plurality of recorded real-time temperature data; and
   rendering the generated graphical heat map to be superimposed on the generated layout diagram for visualizing the layout of the under-floor appliance.

7. The method of claim 2, wherein detecting the abnormality in the recorded plurality of data associated with the under-floor appliance further comprises:
   in response to determining that a sum of a plurality of calculated deviations in the recorded plurality of data associated with the under-floor appliance is greater than a program-defined risk threshold value, returning the detected abnormality in the recorded plurality of data associated with the under-floor appliance.

8. A computer system for predictive maintenance, comprising:
   one or more processors, one or more computer-readable memories, one or more computer-readable tangible storage media, and program instructions stored on at least one of the one or more computer-readable tangible storage media for execution by at least one of the one or more processors via at least one of the one or more memories, wherein the computer system is capable of performing a method comprising:
   recording, using an autonomous robot moving along a surface through a plurality of positions in a room, a plurality of data associated with an under-floor appliance provided beneath the surface of the room;

calculating, based on the recorded plurality of data associated with the under-floor appliance provided beneath the surface of the room, a material composition associated with the plurality of positions in the room; and generating, based on the calculated material composition associated with the plurality of positions in the room, a layout diagram for visualizing a layout of the under-floor appliance provided beneath the surface of the room.

9. The computer system of claim 8, further comprising:

in response to comparing the recorded plurality of data associated with the under-floor appliance provided beneath the surface of the room and a corresponding plurality of baseline data associated with the under-floor appliance provided beneath the surface of the room, calculating a deviation in the recorded plurality of data relative to the plurality of baseline data; and detecting, based on the calculated deviation in the recorded plurality of data relative to the plurality of baseline data, an abnormality in the recorded plurality of data associated with the under-floor appliance, wherein the detected abnormality in the recorded plurality of data associated with the under-floor appliance is indicative of a potential impairment in the under-floor appliance.

10. The computer system of claim 8, further comprising:

training a machine learning (ML) algorithm to detect an abnormality in the recorded plurality of data associated with the under-floor appliance provided beneath the surface of the room based on learning at least one parameter corresponding to an observed normal condition of the under-floor appliance provided beneath the surface of the room;

detecting, using the trained ML algorithm, the abnormality in the recorded plurality of data associated with the under-floor appliance provided beneath the surface of the room;

transmitting, from the autonomous robot to a user device, a visualized warning including a position of the detected abnormality electronically localized in the generated layout diagram for visualizing the layout of the under-floor appliance provided beneath the surface of the room.

11. The computer system of claim 8, wherein calculating the material composition associated with the plurality of positions in the room further comprises:

processing, using a data processing component of the autonomous robot, a plurality of sound waves reflected from the surface of the room;

analyzing, using the data processing component of the autonomous robot, at least one characteristic of the plurality of processed sound waves reflected from the surface of the room; and determining, using the data processing component of the autonomous robot, the material composition associated with the plurality of positions in the room based on the at least one analyzed characteristic of the plurality of processed sound waves reflected from the surface of the room.

12. The computer system of claim 8, wherein recording the plurality of data associated with the under-floor appliance provided beneath the surface of the room further comprises:

in response to receiving a task command from a user device, performing, using a tool component of the autonomous robot, the received task command; and simultaneously recording, using a data collecting component of the autonomous robot, a plurality of real-time data associated with the under-floor appliance provided beneath the surface of the room.

13. The computer system of claim 8, further comprising:

recording, using a temperature module of the autonomous robot, a plurality of real-time temperature data associated with the under-floor appliance provided beneath the surface of the room;

in response to comparing the plurality of recorded real-time temperature data associated with the under-floor appliance and a corresponding plurality of baseline temperature data associated with the under-floor appliance, calculating a plurality of risk scores based on a deviation in the plurality of recorded real-time temperature data relative to the plurality of baseline temperature data;

generating, based on the plurality of calculated risk scores, a graphical heat map for visualizing at least one potential temperature-related impairment in the under-floor appliance associated with the plurality of recorded real-time temperature data; and rendering the generated graphical heat map to be superimposed on the generated layout diagram for visualizing the layout of the under-floor appliance.

14. The computer system of claim 9, wherein detecting the abnormality in the recorded plurality of data associated with the under-floor appliance further comprises:

in response to determining that a sum of a plurality of calculated deviations in the recorded plurality of data associated with the under-floor appliance is greater than a program-defined risk threshold value, returning the detected abnormality in the recorded plurality of data associated with the under-floor appliance.

15. A computer program product for predictive maintenance, comprising:

one or more computer-readable tangible storage media and program instructions stored on at least one of the one or more computer-readable tangible storage media, the program instructions executable by a processor to cause the processor to perform a method comprising:

recording, using an autonomous robot moving along a surface through a plurality of positions in a room, a plurality of data associated with an under-floor appliance provided beneath the surface of the room;

calculating, based on the recorded plurality of data associated with the under-floor appliance provided beneath the surface of the room, a material composition associated with the plurality of positions in the room; and generating, based on the calculated material composition associated with the plurality of positions in the room, a layout diagram for visualizing a layout of the under-floor appliance provided beneath the surface of the room.

16. The computer program product of claim 15, further comprising:

in response to comparing the recorded plurality of data associated with the under-floor appliance provided beneath the surface of the room and a corresponding plurality of baseline data associated with the under-floor appliance provided beneath the surface of the room, calculating a deviation in the recorded plurality of data relative to the plurality of baseline data; and detecting, based on the calculated deviation in the recorded plurality of data relative to the plurality of baseline data, an abnormality in the recorded plurality of data associated with the under-floor appliance, wherein the detected abnormality in the recorded plurality of data associated with the under-floor appliance is indicative of a potential impairment in the under-floor appliance.

17. The computer program product of claim 15, further comprising:
   training a machine learning (ML) algorithm to detect an abnormality in the recorded plurality of data associated with the under-floor appliance provided beneath the surface of the room based on learning at least one parameter corresponding to an observed normal condition of the under-floor appliance provided beneath the surface of the room;
   detecting, using the trained ML algorithm, the abnormality in the recorded plurality of data associated with the under-floor appliance provided beneath the surface of the room;
   transmitting, from the autonomous robot to a user device, a visualized warning including a position of the detected abnormality electronically localized in the generated layout diagram for visualizing the layout of the under-floor appliance provided beneath the surface of the room.

18. The computer program product of claim 15, wherein calculating the material composition associated with the plurality of positions in the room further comprises:
   processing, using a data processing component of the autonomous robot, a plurality of sound waves reflected from the surface of the room;
   analyzing, using the data processing component of the autonomous robot, at least one characteristic of the plurality of processed sound waves reflected from the surface of the room; and
   determining, using the data processing component of the autonomous robot, the material composition associated with the plurality of positions in the room based on the at least one analyzed characteristic of the plurality of processed sound waves reflected from the surface of the room.

19. The computer program product of claim 15, wherein recording the plurality of data associated with the under-floor appliance provided beneath the surface of the room further comprises:
   in response to receiving a task command from a user device, performing, using a tool component of the autonomous robot, the received task command; and
   simultaneously recording, using a data collecting component of the autonomous robot, a plurality of real-time data associated with the under-floor appliance provided beneath the surface of the room.

20. The computer program product of claim 15, further comprising:
   recording, using a temperature module of the autonomous robot, a plurality of real-time temperature data associated with the under-floor appliance provided beneath the surface of the room;
   in response to comparing the plurality of recorded real-time temperature data associated with the under-floor appliance and a corresponding plurality of baseline temperature data associated with the under-floor appliance, calculating a plurality of risk scores based on a deviation in the plurality of recorded real-time temperature data relative to the plurality of baseline temperature data;
   generating, based on the plurality of calculated risk scores, a graphical heat map for visualizing at least one potential temperature-related impairment in the under-floor appliance associated with the plurality of recorded real-time temperature data; and
   rendering the generated graphical heat map to be superimposed on the generated layout diagram for visualizing the layout of the under-floor appliance.

* * * * *